United States Patent [19]

Tanaka et al.

[11] Patent Number: 4,902,090
[45] Date of Patent: Feb. 20, 1990

[54] OPTICAL FIBER FIXING DEVICE

[75] Inventors: Toshiyasu Tanaka, Yokohama; Toshimi Nagaishi; Mituyoshi Suzuki, both of Machida, all of Japan

[73] Assignee: E. I. Du Pont de Nemours and Company, Wilmington, Del.

[21] Appl. No.: 295,415

[22] Filed: Jan. 23, 1989

[51] Int. Cl.⁴ .............................................. G02B 6/36
[52] U.S. Cl. ............................... 350/96.20; 350/96.10
[58] Field of Search ............... 350/96.20, 96.21, 96.22, 350/96.10, 96.23

[56] References Cited
U.S. PATENT DOCUMENTS

| | | | |
|---|---|---|---|
| 4,448,482 | 5/1984 | Lathlaen | 350/96.21 |
| 4,486,072 | 12/1984 | Roberts | 350/96.21 |
| 4,767,176 | 8/1988 | Pohl | 350/96.20 |
| 4,781,430 | 11/1988 | Tanaka | 350/96.20 |

*Primary Examiner*—William L. Sikes
*Assistant Examiner*—Brian M. Healy

[57] ABSTRACT

A fiber fixing device comprising a plurality of metallic tubular members arranged around an optical fiber and a holding member disposed around the tubular members for holding the tubular members in a compressed state. This device is for use in fixing the optical fiber to a plug or the like.

9 Claims, 1 Drawing Sheet

OPTICAL FIBER FIXING DEVICE

BACKGROUND OF THE INVENTION

1. Field of the Invention

This invention relates to a fixing device for fixing an optical fiber to a plug or the like.

2. Description of the Prior Art

Heretofore, the end of an optical fiber has been fixed to an object such as a plug by, for example, using an adhesive, or compressing an optical fiber cable and fixing it to the object.

The method using an adhesive has the disadvantage that curing of the adhesive takes time, and the treatment cannot be performed rapidly.

The method involving compressing and fixing an optical fiber cable has the defect that it cannot fix and support the fiber cable for an extended period of time. The optical fiber cable consists of an optical fiber of glass or a plastic material and a protective jacket of a vinyl resin or the like covering the optical fiber. When the optical cable itself is compressed and fixed, the fixation is proper in the intial stage. But as time elapses, the protective jacket is plastically deformed, and the proper fixation fails.

SUMMARY OF THE INVENTION

The present invention provides a fiber fixing device comprising a plurality of metallic tubular members arranged around an optical fiber and a holding member disposed around the tubular members for holding the tubular members in the compressed state.

DETAILED DESCRIPTION OF THE PREFERRED EMBODIMENT

Figure 1:
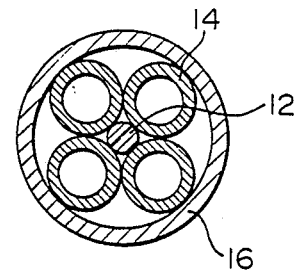
FIG. 1 is a sectional view showing the positional relationship between an optical fiber, fixing pipes and a holding pipe in the fiber fixing device of the invention before they are forced into a pressure pipe.
Figure 2:
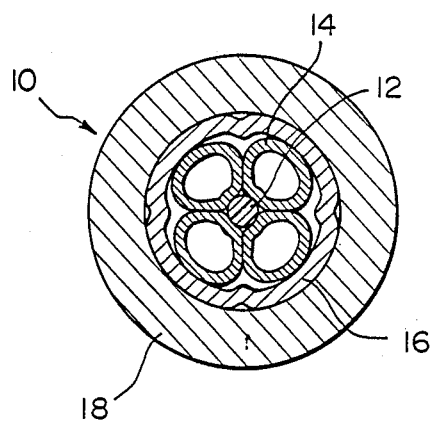
FIG. 2 is a sectional view of the fiber fixing device of the invention after the above members have been forced into a pressure pipe.

With reference to FIGS. 1 and 2, the fiber fixing device of the invention in accordance with a preferred embodiment will be described.

The fiber fixing device 10 includes four fixing pipes 14 surrounding an optical fiber 12, a holding pipe 16 disposed around the fixing pipes 14, and a pressure pipe 18 disposed around the holding pipe 16.

The four fixing pipes 14 are metallic tubular bodies having a circular cross section, and before forced into the pressure pipe 18, they have such a dimension as to contact the optical fiber 12 and the adjoining two fixing pipes 14, as shown in FIG. 1.

The holding pipe 16 is a metallic tubular body having a circular cross section, and before forced into the pressure pipe 18, has such a dimension as to make contact with, and hold, the outer circumferences of the four fixing pipes 14.

The pressure pipe 18 has an inside diameter smaller than the outer circumferential length of the holding pipe 16.

The above-described members are positioned as shown in FIG. 2 by the following procedure.

First, the four fixing pipes 14 are arranged so as to surround the optical fiber 12, and held in this state by the holding pipe 16.

The optical fiber 12, the fixing pipes 14 and the holding pipe 16 so positioned are forced into the pressure pipe 18 having a smaller inside diameter than the outside diameter of the holding pipe 16. Consequently, the fixing pipes 14 and the holding pipe 16 are deformed as shown in FIG. 2.

The fixing pipes 14 are plastically deformed and make contact with the optical fiber 12 at many points of contact and hold them elastically.

At least three fixing pipes 14 would be able to hold the optical fiber 12 when forced into the pressure pipe 18. It is preferred however to arrange an even number of fixing pipes 14 so that they can be similarly deformed on both sides of the central axis of the optical fiber 12.

The fixing pipes 14 may be hollow rod-like members, but preferably have a circular to elliptic cross section to avoid contacting of their acute-angled parts with the optical fiber 12.

The fixing pipes 14 ar made of a metal such as copper so that when force into the pressure pipe 18 as above, they are plastically and elastically deformed and contact the optical fiber 12 at their planer surfaces.

The holding pipe 16 holds the fixing pipes 14 around the optical fiber 12 before they are forced into the pressure pipe 18, and transmit the pressure produced by the pressure pipe 18 after they are forced into the pressure pipe 18. The holding pipe 16 may be a relatively thin-walled metallic pipe. The use of this holding pipe 16 is preferred because it permits easy operation of forcing the fixing pipes 14 into the pressure pipe 18. If desired, the holding pipes may be omitted by using a suitable jig.

The pressure pipe 18 is preferably made of a metal such as thick stainless steel because it serves to maintain the fixing pipes 16 in the compressed state.

By fixedly providing the pressure pipe 18 in a plug or the like, the optical fiber can be fixed.

The fiber fixing device of this invention can hold optical fibers suitably for a long period of time.

According to the fiber fixing device of this invention, optical fibers can be fixed within a relatively short period of time.

The fiber fixing device of this invention hardly does damage to optical fibers, and light transmission losses at their fixed parts can be reduced.

We claim:

1. A fiber mixing device for fixing an optical fiber comprising:
   a plurality of tubular fixing members for arranging around the optical fiber; and
   means for holding the fixing members around the optical fiber in a compressed state, the holding means shaped such that when the fixing members are arranged around the optical fiber, the fixing members must be forced to be inserted into the holding means, thereby, causing the fixing members to plastically deform and make contact with the optical fiber at many points elastically holding the optical fiber.

2. The device of claim 1, wherein the fixing members have a circular cross section when the fixing members are not deformed.

3. The device of claim 1, wherein the number of the fixing members is four.

4. The device of claim 1, wherein each of the fixing members has a cross sectional dimension capable of contacting the optical fiber and two adjacent ones of the fixing members when the fixing members are not deformed.

5. The device of claim 1, further comprising:
an optical fiber for being held by the holding means.

6. The device of claim 1, wherein the holding means comprises:
a tubular pressure member for providing pressure on the outer circumferences of the fixing members.

7. The device of claim 6, wherein the holding means further comprises:
a tubular holding member for contacting the outer circumferences of the fixing members, the tubular pressure member having an inside diameter smaller than the outer circumference of the holding member such that when the fixing members are arranged around the optical fiber, the holding member is contacting the outer circumferences of the fixing members, and the holding member and fixing members are forced into the pressure member, the fixing members plastically deform and make contact with the optical fiber at many points elastically holding the optical fiber.

8. The device of claim 7, wherein the fixing members, the holding member and the pressure member are metallic.

9. The device of claim 7, wherein the holding member is metallic and has a circular cross section before the holding member is forced into the pressure member.

* * * * *